Sept. 20, 1960          D. M. SMYTH ET AL          2,953,620
                        BATTERY CELL STRUCTURE
                        Filed May 6, 1957
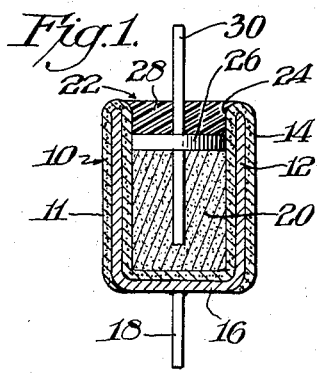
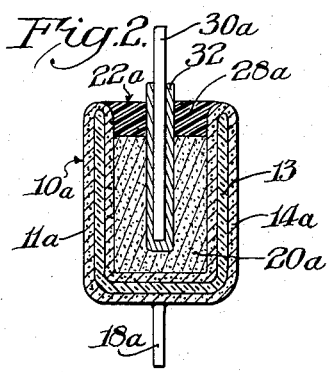
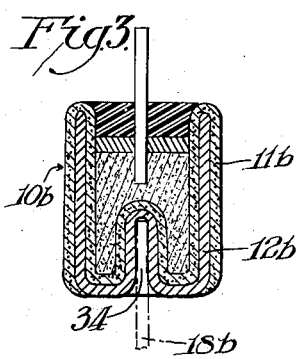
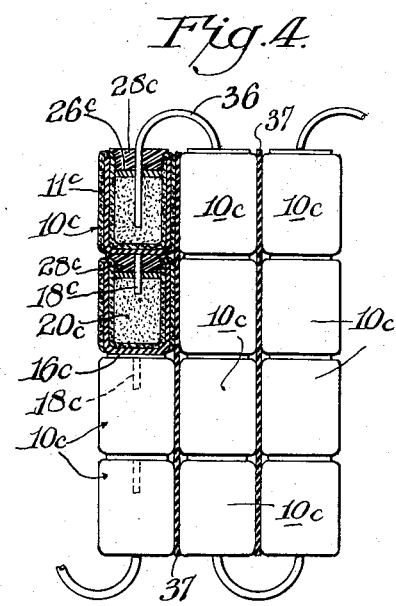
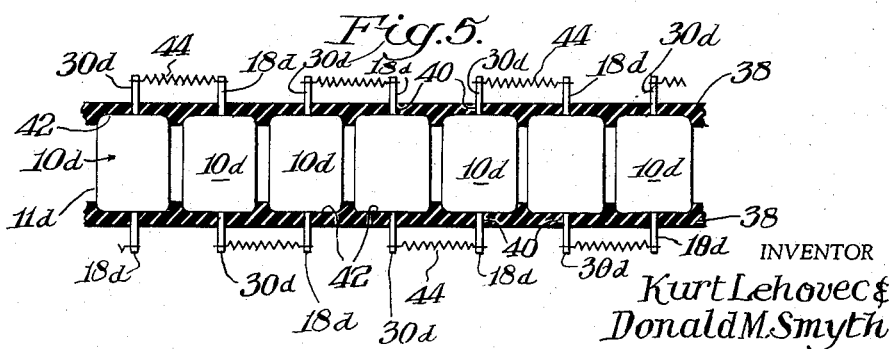
INVENTOR
Kurt Lehovec &
Donald M. Smyth
BY Connolly and Hutz
ATTORNEY United States Patent Office 2,953,620
Patented Sept. 20, 1960

2,953,620
BATTERY CELL STRUCTURE

Donald M. Smyth and Kurt Lehovec, Williamstown, Mass., assignors to Sprague Electric Company, North Adams, Mass., a corporation of Massachusetts Filed May 6, 1957, Ser. No. 657,178

12 Claims. (Cl. 136—83)

This invention relates to a novel structure for a battery cell, and more particularly to such a structure for a battery cell including solid components.

In a solid electrolyte battery cell having a structure of the type described in U.S. Letters Patent 2,690,465, the cathode or electron acceptor material, for example iodine, emits extremely corrosive vapors. This emission also occurs, for example, when the cathode material includes others of the halogens.

Another disadvantage of existing types of these solid battery cells is an excessive amount of surface conduction between the cathode material and the anode along exposed elements in contact therewith which causes a continuous current drain which drastically reduces the shelf life of these cells.

An object of this invention is to provide a novel structure for a solid electrolyte battery cell which effectively enseals the cathode material and minimizes potential surface leakage between and from the cathode and anode material.

In accordance with this invention, the cathode material of a solid electrolyte battery cell is deposited within a laminated cup-shaped element. The wall of the cup-shaped element includes layers of dissimilar electrical conductivity. One of these layers may be made of anode material with a layer of barrier electrolyte disposed therewithin, or one of these layers may be comprised of a core of an inert nonconductive material coated substantially on all surfaces with conductive material.

An inert seal is inserted to plug the open end of the cup and confine the cathode material within the cup. This seal may include a relatively inert sealant which may be protected by an even more inert washer which may be interposed between the sealant and the cathode material to protect the sealant from the corrosive vapors emitted from the cathode material. A conductive element is inserted through this sealant into intimate electrical contact with the cathode material.

This conductive element may be an anode coated with a solid barrier electrolyte where the cup-shaped element includes a core of inert nonconductive material, or it may merely be a contact element providing an electrical connection to the cathode material where one of the layers of the laminated wall of the cup-shaped element is made of anode material. Potential surface conduction paths are relatively long in both of these illustrative forms to minimize surface leakage.

A compact array of such cells may be obtained by extending conductive elements from the bases or bottoms of the aforementioned cup-shaped elements. These cups may then be successively assembled in a row with the bottom of each cup disposed adjacent the open mouth of the next. The conductive elements extending from the bottoms of each cup pass through the sealant in the mouths of the adjacent cups and connect successive cells in series. These cups with conductive elements extending from mouths and bases may also be assembled side-by-side between a pair of plates of insulating material including apertures through which the extending leads are inserted. The leads are connected as desired across the outside surfaces of these plates.

Novel features and advantages of the present invention will become apparent to one skilled in the art from a reading of the following description in conjunction with the accompanying drawings wherein similar reference characters refer to similar parts and in which:

Fig. 1 is a cross-sectional view in elevation of one embodiment of this invention;

Fig. 2 is a cross-sectional view in elevation of another embodiment of this invention;

Fig. 3 is a cross-sectional view in elevation of still another embodiment of this invention;

Fig. 4 is a view in elevation partially in cross-section of an assembled array of series-connected battery cells which is a further embodiment of this invention; and Fig. 5 is a view in elevation partially in cross-section of another assembled array of series-connected battery cells which is a still further embodiment of this invention.

In Fig. 1 is shown a battery cell 10 including a cup-shaped element 11 including a layer 12 of a metallic electron-donor anode material, for example, silver, which is substantially completely coated with a layer 14 of barrier electrolyte, for example silver chloride. This silver chloride layer completely coats the inner surface of cup 11 and covers the outer surface with the exception of a bare spot of small extent upon the base or bottom 16 of cup-shaped element 11 at which a conductive lead or wire 18 of a substantially inert material, for example tantalum is joined, for example, by spot welding or any other method which insures effective electrical contact, such as use of a conducting cement, for example, made of an epoxy resin loaded with silver particles. The substantially complete coverage of anode layer 12 by the silver chloride barrier electrolyte layer 14 provides a potential surface leakage path of maximum length as is later more fully discussed.

A non-metallic electron-acceptor cathode material 20 for example, iodine is incorporated in a suitable conductive matrix, for example, finely ground carbon and deposited within cup or can 11. This cathode material 20 may be prepared for deposition, for example, by addition of a suitable binder and rolling into a cylinder and then cutting off suitable lengths as is later described in detail. A suitable binder is a grease, for example, Kel-F grease, which is a polymer of trifluorochloroethylene and is a product of the M. W. Kellogg Co. The mixture of iodine and carbon can also be pressed into pellets without a binder and then deposited within can 11.

A plug 22 is then inserted within the open mouth 24 of laminated cup-shaped element 11 to hermetically seal the cathode material 20 therewithin. A plug 22 which effectively seals and resists the corrosive vapors of a halogen cathode material, such as iodine, includes, for example, a silver chloride washer 26 and an outer sealant element 28 of Teflon or Kel-F. Teflon is a tetrafluoroethylene polymer made by the Du Pont Company and Kel-F is a thermoplastic polymer of trifluorochloroethylene made by the M. W. Kellogg Co. A plug of Teflon or Kel-F effectively seals when it is assembled by means of a reasonably firm press fit with the lead element 30 and the mouth of can 11.

Another effective sealant material is, for example, a thermosetting liquid epoxy resin such as Hysol 6053, a product of Houghton Laboratories, Inc., including ethylene triamine hardener in respective 10-1 ratios. An outer sealant plug 28 of an epoxy resin is, for example, effectively formed directly upon the conductive wire or lead element 30 which extends through plug 22 into electrical contact with cathode material 20. A precured epoxy plug may be formed, for example, directly upon contact element 30 by applying Hysol 2501 epoxy powder filled with talc. This plug is effectively formed upon wire 30 by means of compression forming and should have an outer diameter slightly larger than the inside diameter of coated cup 12. This plug is precured and washer 26 is then slipped over the lead 30 against the face of the epoxy plug 28.

Silver chloride washer 26, for example, is 5 mils in thickness with an outside diameter slightly larger than the inside diameter of cup or can 12 and an inside diameter slightly smaller than lead 30 to fit snugly in contact with the can and lead when the washer and plug are forced into the can. Washer 26 centers element 30 within the can as well as shielding plug 28 from the corrosive vapors of the cathode material. This centering function of the washer is most critical only when a liquid plug is poured on top of the silver chloride washer 26. Centering is similarly provided by a preformed press-fitted plug of Teflon.

Element 30, as shown in Fig. 1, is merely a contact element and may be effectively made of an inert conductive material, for example tantalum, and as later discussed, may be a lead similar to 18 which extends from the bottom of another battery cell when assembled in an array as is described later in detail in conjunction with Fig. 4.

An alternative method of forming a laminated cup-shaped element 11 is, for example, by a cup-shaped enclosure formed of a layer of a plastic barrier electrolyte material, for example, silver chloride which is then coated upon its outer surface with a layer of a suitable anode material, for example silver paint. This structure, however, does not include the advantageous maximum length surface conduction path of the structure shown in Fig. 1.

An anode of efficient size and configuration, for example, is formed of a silver cup-shaped layer 12 whose outer dimensions are approximately 0.200 inch in length with a diameter of 0.060 inch. Effective wall and base or bottom thicknesses are a uniform 0.005 inch. The cathode material 20 may be effectively formed and deposited by rolling it with the aforementioned suitable binder into cylinders of slightly smaller diameter than the inside diameter of the coated can which are sliced to a length less than the inside height of the can. A suitable length for the cylinders ranges for example, between 0.10 and 0.15 inch which lengths are conveniently sliced from the rolled cylinder and then dropped within the cans. The silver chloride coating or barrier-electrolyte layer 14 is effectively formed, for example, upon the silver can or layer 12 by preheating the silver in a chlorine atmosphere. The base 16 of the can may be then freed for connection to lead or terminal 18 by dissolving the chlorine or abrading it away.

In Fig. 2, a battery cell 10a is shown in which the core or inner layer of cup-shaped element or can 11a is made of a layer 13 of an inert non-conductive material, for example, glass. This glass core or cup 13 is completely coated by a conductive film or layer 14a, for example, of tin oxide. Conductive element 30a in this instance is made of anode material, for example, silver wire, which is coated with a layer of an electrolyte material 32, for example silver chloride. Cathode material 20a, similar to the material described in conjunction with the material in Fig. 1, is deposited within laminated cup or can 11a and sealed therein by means of a plug 22a, for example of the type described in Fig. 1 made of Teflon only which is so impervious to halogen vapors that the silver chloride shielding washer shown in Fig. 1 can be omitted if desired.

A lead 18a is intimately joined to conductive layer 14a to provide electrical contact with the cathode material 20a. Lead 18a is, for example, coated with an electrolyte such as layer 32 deposited upon element 30a and utilized as the anode element of another cell when assembled in the configuration later described in conjunction with Fig. 4.

In Fig. 3 is shown a battery cell structure 10b which is similar, for example, to the structure shown in Fig. 1 with the exception that the bottom or base of cup-shaped element 11b is indented to provide a tubular indentation 34 at the base or bottom of anode layer 12b within which a lead 18b is intimately inserted by a snug force fit to provide electrical contact with layer 12b.

The structures shown in Figs. 1–3 provide a number of advantageous features for solid electrolyte battery cells. The cup-shaped or can type construction incorporates only a very small open area which must be sealed to hermetically confine the highly active and corrosive vapors of a non-metallic cathode material, for example of the halogen type, which has been found to be particularly effective in battery cells of this type. This relatively small orifice can be effectively sealed, for example, by means of a press-fitted Teflon or Kel-F plug which can remain impervious to halogen vapors reasonably indefinitely. An interposed washer of a material even more impervious to these vapors, for example a barrier electrolyte material such as silver chloride, may be used to prolong longevity for a Teflon plug and is essential for shielding an epoxy plug.

Furthermore, the surface conduction paths from the anode and cathode elements and therebetween in the layer structures described herein are inherently of relatively great length which minimizes surface conduction from the anode and cathode element and particularly therebetween. This greatly increases the storage or shelf life of the battery cells.

The lead 18 extending from the base or bottom of the laminated cans 11 may be advantageously utilized when assembling a plurality of battery cells in a multiple-cell battery array. In Fig. 4, for example, a plurality of cells 10c, for example, of the type shown in Fig. 1, are arranged in succession with the closed end of one laminated cup-shaped element 11c disposed adjacent the open end or mouth of the next cup-shaped element 11c. Conductive lead 18c of an inert material, for example tantalum, extending from the bottom 16c of each cell is inserted through plug 22c into the cathode material 20c of the adjacent cell. This provides a highly compact and rigid series-connected multiple cell battery array including any conceivable number of elements. The plug 28c may be used to mechanically join one cell with the next or a suitable adhesive material may be interposed therebetween to provide substantial rigidity.

A number of rows of cells formed in this manner may be assembled side by side by means of U-shaped leads 36 which bridge the cells 10c at the extremities of adjacent rows to provide a means of assembling a great number of series-connected battery cells within a compact space. Adjacent cells 10c are electrically separated by interposed insulating material 37, for example, Teflon, applied, for example, in sheet or spray form. In multiple row arrays of the type shown in Figs. 4 and 5, the cans may be advantageously made polygonal in cross-section, for example, square or hexagonal, or octagonal to conserve space and provide a honeycomb type structure.

In Fig. 5, another multiple-cell structure is shown which includes, for example, a plurality of battery cells 10d of the type shown in Fig. 1 including a lead 30d extending from the open end of can-shaped element 11d and a lead 18d extending from the bottom of each can 11d. These cells are assembled side by side between a pair of inert non-conductive plates 38, for example, of Micarta or Bakelite. Plates 38 include apertures 40 through which leads 18d and 30d are inserted. Indentations or recesses 42 conforming to the outer dimensions of the open and closed ends of cells 12d are provided, for example, in the inner surfaces of plates 38 to securely grasp and retain an assembled array of cells 10d. Adjacent cells are insulated by air spaces 43, but positive insulation may also be utilized to provide a more compact and more dependable structure.

Cells 10d in Fig. 5 are arranged in alternate inverted positions to facilitate their series-connection by means of leads 44 which connect leads 30d and 18d of adjacent cells, for example, by being soldered thereto. Leads 44 are made of any highly conductive material such as nickel wire which can be spot welded to tantalum leads. Cells 10d, however, may be arranged in non-inverted side-by-side orientation to facilitate parallel connection if a relatively high current output multiple-cell array is desired.

What is claimed is:

1. A structure for a battery cell comprising a cup-shaped anode made of an electrochemically active material, cathode material disposed within said cup-shaped anode, a sealing layer disposed within the open end of said cup-shaped anode for confining said cathode material therewithin, a conductive lead extending through said sealing layer into contact with said cathode material, and an ionically conducting layer of solid barrier-electrolyte material coating the inner surface of said anode and substantially coating the outer surface of said anode thereby providing a solid electrolyte barrier between said anode and said cathode and lengthening the surface conduction paths from said anode to said cathode to minimize surface conduction therefrom and therebetween.

2. A structure as set forth in claim 1 wherein said conductive lead is made of a material which is chemically inert to said cathode material.

3. A structure as set forth in claim 1 wherein said layer of barrier electrolyte material substantially covers the inner and outer surfaces of said anode element with the exception of a bare surface of limited area upon said anode element for attaching a conductive lead thereto.

4. A structure as set forth in claim 3 wherein said conductive lead is comprised of a cathode contact element, and an anode contact element is electrically connected to said bare surface of said anode layer.

5. A structure for a battery cell as set forth in claim 3, wherein said cup-shaped element includes a cylindrical indentation for snugly engaging a conductive lead.

6. A structure for a battery cell as set forth in claim 1 wherein said seal is comprised of a press-fitted plastic selected from the group consisting of Teflon and Kel-F.

7. A structure for a battery cell as set forth in claim 1 wherein said seal includes a plastic shielded from said cathode material by a silver chloride washer.

8. A structure as set forth in claim 1 wherein said cathode material includes a binder of Kel-F grease.

9. A battery cell assembly comprising a plurality of battery cells having a structure as set forth in claim 3, said plurality of battery cells being arranged in succession with the closed end of one cup-shaped element being disposed adjacent the open end of the next cup-shaped element, and said conductive elements being electrically connected to the bases of said cup-shaped elements.

10. A battery cell assembly comprising a plurality of battery cells having a structure as set forth in claim 3 wherein said conductive elements extend a distance from said open ends and additional conductive leads extend from the bases of said cup-shaped elements, said individual cells being arranged between a pair of non-conductive end plates, said end plates including apertures for receiving said extending conductive elements and leads, and further conductive means electrically connecting said leads and said elements across the outer surfaces of said non-conductive end plates.

11. A battery cell assembly as set forth in claim 10 wherein recesses are disposed within the inner surfaces of said end plates for anchoring said cells therebetween.

12. A structure for a battery cell as set forth in claim 1 wherein said solid barrier-electrolyte material is silver chloride and said electro-chemically active metal anode is silver.

References Cited in the file of this patent

UNITED STATES PATENTS

| | | |
|---|---|---|
| 520,429 | Hoggson | May 29, 1894 |
| 1,380,034 | Bladerston | May 31, 1921 |
| 1,901,588 | Eckstein | Mar. 14, 1933 |
| 2,592,439 | Lee | Apr. 8, 1952 |
| 2,666,800 | Haynes | Jan. 19, 1954 |
| 2,702,309 | Oppenheim | Feb. 15, 1955 |
| 2,759,986 | Morehouse et al. | Aug. 21, 1956 |
| 2,793,244 | Van der Grinten | May 21, 1957 |